United States Patent [19]

Yoshida et al.

[11] E Re. 29,148

[45] Reissued Mar. 8, 1977

[54] COLOR PHOTOGRAPHIC DIFFUSION TRANSFER PROCESS

[75] Inventors: Yoshinobu Yoshida; Atsuaki Arai, both of Minami-ashigara, Japan

[73] Assignee: Fuji Photo Film Co., Ltd., Minami-ashigara, Japan

[22] Filed: Sept. 17, 1975

[21] Appl. No.: 614,468

Related U.S. Patent Documents

Reissue of:

[64] Patent No.: 3,849,131
Issued: Nov. 19, 1974
Appl. No.: 388,670
Filed: Aug. 15, 1973

[30] Foreign Application Priority Data

Aug. 17, 1973 Japan ..... 48-82274

[52] U.S. Cl. ..... 96/3; 96/29 D; 96/66 HD; 96/77

[51] Int. Cl.[2] ..... G03C 7/00; G03C 5/54; G03C 1/40; G03C 5/30

[58] Field of Search ..... 96/3, 29 D, 77, 66 HD, 96/66 R, 66.3, 95

[56] References Cited

UNITED STATES PATENTS

| | | | |
|---|---|---|---|
| 2,983,606 | 5/1961 | Rogers | 96/3 |
| 3,577,236 | 5/1971 | Fix | 96/3 |
| 3,617,277 | 11/1971 | Stewart | 96/29 D |
| 3,764,337 | 10/1973 | Arai et al. | 96/100 |

OTHER PUBLICATIONS

Fisher et al., "The condensation of Polyhydric Phenols and Acetone" *Journal of the Am. Chem. Soc.* vol. 58, 1936 pp. 820–822.

Baker et al., "Condensation Products of Phenals and Ketones, Part III" *J. of the Chemical Soc.*, London, 1939, pp. 195–202.

*Primary Examiner*—David Klein
*Assistant Examiner*—Richard L. Schilling
*Attorney, Agent, or Firm*—Sughrue, Rothwell, Mion, Zinn & Macpeak

[57] ABSTRACT

A color photographic diffusion transfer process in which a color photographic material having at least one silver halide emulsion layer and a layer adjacent to said silver halide emulsion layer, said layer containing a dye developer, is image-wise exposed, brought into superposed position with an image-receiving element, and then treated with an alkaline processing solution to immobilize the dye developer at the exposed portions of the silver halide emulsion layer and diffusion-transfer the dye developer at the nonexposed portions of the silver halide emulsion layer to the image-receiving element, with the alkali processing being conducted in the presence of 6,6′,7,7′-tetrahydroxy-4,4,4′,4′-tetramethyl-bis-2,2′-*spirochroman*. [spirocumarone]

6 Claims, No Drawings

COLOR PHOTOGRAPHIC DIFFUSION TRANSFER PROCESS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a color photographic diffusion transfer process and more particularly it relates to an improved color photographic diffusion transfer process for color photographic materials containing dye developers.

2. Decription of the Prior Art

Diffusion transfer photographic processes using dye developers or compounds which are dyes and developers for silver halide have been reported in many patents including U.S. Pat. No. 2,983,606 and British Patent No. 804,971. In these processes, as described in the specifications thereof, an exposed photosensitive silver halide emulsion layer is developed in the presence of a dye developer, whereby an imagewise distribution of the unreacted and unoxidized dye developer is formed as a function of the development. The unreacted and unoxidized dye developer is mobile in the processing solution and at least a part of the imagewise distributed dye developer is transferred to a superposed image-receiving element.

In a specific embodiment of the above-described diffusion transfer processes, a photosensitive element having a silver halide emulsion and a dye developer is exposed and a liquid processing composition is applied to the photosensitive element by, for instance, immersing, coating, spraying, etc. Before, during, or after the application of the aforesaid liquid processing composition, the photosensitive element is superposed on an image-receiving element which can be dyed with the dye developer. In a preferred embodiment, the photosensitive element contains the dye developer in a layer adjacent to the side of a silver halide emulsion layer away from the incident light. The silver halide emulsion layer of the photosensitive element is placed on the image-receiving layer of the image-receiving element and a liquid processing composition is spread as a thin layer between the two layers. The liquid processing composition diffuses into the silver halide emulsion layer and the dye developer-containing layer to develope the developable silver halide and the dye developer thus developed the silver halide is immobilized.

This immobilization is apparently due, at least in part, to the reduction is mobility or solubility of the oxidation product of the dye developer as compared with that of the unoxidized dye developer. The immobilization may be also due, at least in part, to the localized reduction of alkali concentration as a function of development.

Since the unreacted dye developer at the nondeveloped areas of the silver halide emulsion layer is diffusible, an imagewise distribution of the mobile unoxidized dye developer is formed as a function of the exposure and development of the silver halide emulsion. At least a part of the diffusible unoxidized dye developer thus imagewise distributed is transferred to the superposed image-receiving layer. This transfer of the unoxidized dye developer is clearly distinguished from the less mobile oxidized dye developer and thus a transferred image is formed on the image-receiving layer.

When a photosensitive element has differently sensitized silver halide emulsion layers and each silver halide emulsion layer is associated with each dye developer which has substantially a complementary color to the main sensitive region of the silver halide emulsion, that is to say, when a silver halide emulsion having sensitivity to red light is associated with a cyar dye developer, a silver halide emulsion having sensitivity to green light with a magenta dye developer, and a silver halide emulsion having sensitivity to blue light with a yellow dye developer, each dye developer is oxidized and immobilized in the developed region or area of each associated silver halide emulsion layer. The dye developers in the nondeveloped portions of the silver halide emulsion layers diffuse and are transferred to the image-receiving element superposed on the photosensitive element.

Therefore, when large proportions of unoxidized dye developers are present in the sufficiently exposed negative portions corresponding to the highlight portions of field or original, they diffuse to an image-receiving element as the unoxidized dye developers present in the nonexposed negative portions corresponding to dark portions of field or original and hence a transferred image having a high minimum density and indistinct light and darkness is formed.

On the other hand, the typical dye developers as disclosed in the specifications of U.S. Pat. Nos. 3,255,001,

| | | | |
|---|---|---|---|
| 2,992,106; | 3,297,441; | 3,134,762; | 3,236,643; |
| 3,134,673; | 3,236,645; | 3,134,764; | 3,134,672; |
| 3,134,765; | 3,183,089; | 3,135,734; | 3,135,604; |
| 3,173,906; | 3,222,169; | 3,183,000; | 3,201,384; |
| 3,246,985; | 3,208,991; | 3,142,565; | 3,218,312; |
| 3,230,086; | 3,262,924; | 3,275,617; | 3,077,402; |
| 3,282,913; | 3,141,772; | 3,299,041; | 3,309,199; |
| 2,983,605; | 3,047,386; | 3,076,820; | 3,173,929; |
| 3,230,083; | 3,236,864; | 3,239,339; | 3,252,969; |
| 3,253,001; | 3,288,778; | 3,209,016; | 3,135,606; |
| 3,076,808; | 3,126,280; | 3,236,865; | 3,135,605; |
| 3,255,205; | 3,131,061; | 3,347,673; | 3,347,672; |
| 3,246,016; | 3,245,790; | 3,086,005 | 3,295,973; |

3,307,947; 3,230,082; 3,230,085; etc. for instance, such cyan dye developers as 1,4-bis-(α-methyl-β-hydroxynonylpropylamino)-5,8-dihydroxyanthraquinone, etc., such magenta dye developers as 4-propoxy-2-[p-(β-hydroquinonylethyl)-phenylazo]-1-naphthol, etc., and such yellow dye developers as 1-phenyl-3-N-n-hexylcarboxyamido-4-[p-2′,5′-dihydroxyphenethyl) phenylazo]-5-pyrazolone, etc., are weak developing agents for silver halides even when they are used in a comparatively highly alkaline state of a pH of about 1.3. Accordingly, when such conventional dye developers are used, the desired maximum density, gradation, and sensitivity cannot be obtained. Since the immobilization of the dye developers occurs as a function of the development of silver halide emulsion layers, the transferred image obtained in the diffusion transfer process shows undesirably high minimum density, low maximum density, and low contrast in the highlight regions.

This is due, in part, to the fact that the dye developers have weak development activity as a developing agent for silver halide, to the fact that the dye developers near silver are not completely effectively used, and also to other factors.

Furthermore, in a multicolor system it happens that a silver halide emulsion layer is developed not only by the dye developer having substantially complementary color to the main sensitive region of the silver halide emulsion but also by other dye developers associated with other silver halide emulsion layers. For instance, a magenta dye developer which is associated with a green-sensitive silver halide emulsion layer diffuses partially into a blue-sensitive emulsion layer and a red-sensitive emulsion layer to initiate development and is immobilized there, which results in forming a transferred image containing less magenta dye.

In the specifications of Japanese Patent Publication Nos. 4839/1960, 10240/1959, and 2241/1962, the disclosures are that by adding a colorless auxiliary developer such as 1-phenyl-3-pyrazolidone to a processing composition, the development of the silver halide is accelerated and the immobilization of the dye developers in the photosensitive element is accelerated improving to some extent the above-mentioned disadvantage. Also, the use of a hydroquinone such as 4'-methylphenyl hydroquinone as an auxiliary developing agent is described in the specifications of Japanese Patent Publication Nos. 29130/1964 and 13837/1968 and the use of a catechol such as 4-methylcatechol as an auxiliary developing agent is described in the specification of British Patent No. 1,243,539. However, the improvements attained by the above-described inventions are not yet satisfactory and when, in particular, those auxiliary developing agents are used in multicolor-type multilayer photographic elements, it is difficult to obtain satisfactory multicolor transferred images since each dye developer does not cause the development to the necessary extent and also does not cause the development so that the dye developer is fixed in the rate necessary for each specific layer. Still further, it has frequently been observed that a part of the auxiliary developing agents is transferred to an image receiving element causing stains of the color images.

SUMMARY OF THE INVENTION

As the results of various investigations in discovering an improved color diffusion transfer process without having the above-described diffulties, the inventors have achieved the process of this invention. That is to say, according to the present invention, there is provided a color diffusion transfer process comprising imagewise exposing a color photographic material having at least one silver halide emulsion layer and a dye developer disposed adjacent to the silver halide in the silver halide emulsion layer and processing the exposed material with an alkaline processing solution in a superposed relation with an image-receiving material to immobilize the dye developer at the exposed portions of the silver halide emulsion layer and transfer by diffusion to the image-receiving material the dye developer at the unexposed portions of the silver halide emulsion layer, and conducting the processing with the alkaline processing solution in the presence of 6,6', 7,7'-tetrahydroxy-4,4,4',4'-tetramethyl-bis-2,2'- [spirocumarone] *spirochroman.*

DETAILED DESCRIPTION OF THE INVENTION 6,6',7,7'-Tetrahydroxy-4,4,4',4'-tetramethyl-bis-2,2'-[spirocumarone] *spirochroman* used in this invention is a substantially colorless compound and is, hereinafter, called an "auxiliary developing agent" for the purpose of distinguishing it from the dye developers. The auxiliary developing agent can be present in the processing composition or in the image receiving element but it is preferable that the auxiliary developing agent be present in the negative photosensitive element containing the dye developers. In the above preferred case, various methods can be employed for incorporating the auxiliary developing agent in a hydrophilic colloid layer of the negative photosensitive element. For instance, in one embodiment the auxiliary developing agent used in this invention is dissolved in a substantially water-insoluble high boiling organic solvent and after finely dispersing the solution in aqueous solution of a hydrophilic colloid, the dispersion thus containing the auxiliary developing agent is coated. In another embodiment the auxiliary developing agent is dissolved in an alkaline aqueous solution and after mixing the solution with an aqueous solution of a hydrophilic colloid, the mixture is coated. In still other embodiment the auxiliary developing agent is dissolved in a low-boiling organic solvent such as methanol or ethyl acetate and after mixing the solution with aqueous solution of a hydrophillic colloid, the mixture is coated.

The multilayer-type diffusion transfer color photographic material used in this invention has desirably, as a layer structure, on a support a red-sensitive emulsion layer, a green-sensitive emulsion layer and a blue-sensitive emulsion layer in this order and the emulsion layers have associated therewith a cyan dye developer, a magenta dye developer and a yellow dye developer, respectively. If necessary, the color photographic material can have a yellow filter layer, an antihalation layer, intermediate layers, and a protective layer.

The silver halide emulsion used in the present invention is a colloidal dispersion of silver chloride, silver bromide, silver chlorobromide, silver iodobromide or silver chloroiodobromide or a mixture thereof. The composition of the halide is selected depending on the purpose to which the element is to be applied and treatment conditions of the sensitive material. Particularly, a silver iodobromide or chloroiodobromide emulsion consisting of 1 – 10 mol percent of iodide, less than 30 mol percent of chloride and a balance of bromide is preferred. The mean particle size of the emulsion is usefully within a range of about 0.1 to about 2 microns and a uniform particle size is desirable depending on the end use purpose of sensitive material. Particles are of a cubic, an octahedral or a mixed crystal system. These silver halide emulsion can be prepared using conventional techniques, for example, as disclosed in P. Glafkides: Chimie Photographique. Chap. 18–23, 2nd edition, 1957, Paul Moncle, Paris. For example, a soluble silver salt such as silver nitrate and a water soluble halide such as potassium bromide are reacted in a solution of a protective colloid such as gelatin and the crystal growth accomplished in the presence of an excess of halide or a solvent for silver halide, such as ammonia. In this case, a precipitation method such as the single or double jet method or pAg control double jet method can be used. The removal of the soluble salts from the emulsion is by washing a cooled and coagulated emulsion with water, dialysis thereof, or settlement by adding a precipitating agent such as an anionic polymer or a surface active agent having sulfon, sulfuric acid ester or carboxylic group and controlling the pH or by using an acylated protein such as phthaloyl gelatin as the protective colloid and controlling the pH. The silver halide emulsion used in the present invention is desirably sensitized by subjecting the emulsion to a heat treatment in conjunction with sensitizers naturally contained in gelatin, a sulfur sensitizer such as sodium thiosulfate or N,N,N'-trimethyl thiourea, a gold sensitizer such as thiocyanate or the thiosulfate complex salt of monovalent gold, or a reducing sensitizer such as stannous chloride or hexamethylenetetramine (for example, as described in U.S. Pat. Nos. 1,623,499; 2,399,083; 3,297,447; and 3,297,446). Both an emulsion, by which a latent image is easily formed on the surfaces of particles, and an emulsion as described in U.S. Pat. Nos. 2,592,550 and 3,206,313 etc., by which a latent image is easily formed in the interior of the particles, can be used in the present invention.

The silver halide emulsion used in the present invention can be stabilized with an additive such as 4-hydroxy-6-methyl-1,3,3a, 7-tetrazaindene, 5-nitrobenzimidazole, 1-phenyl-5-mercaptotetrazole, 8-chloromercuriquinoline, benzenesulfinic acid and pyrocatechin. In addition to these compounds, inorganic compounds such as cadmium and mercury salts, and the complex salts of platinum group elements, such as the chlorine complex salt of palladium, are useful for the stabilization of the sensitive material according to the present invention. Further, the silver halide emulsion used in the present invention can contain a sensitizing compound such as polyethylene oxide compound (for example, as described in U.S. Pat. Nos. 3,046,134; 2,944,900; and 3,294,540).

The silver halide emulsion used in the present invention, if desired, can have its color sensitivity extended with an optical sensitizing dye. As useful optical sensitizers, there are mentioned the cyanines, merocyanines, homopolar cyanines, styryls, hemicyanines, oxanoles, hemioxanoles and the like. Examples of these optical sensitizers are decribed in by P. Glafkides, supra (chap. 35 – 41) and F. M. Hamer: The Cyanine Dyes and Related Compounds (Interscience). In particular, cyanines, in which the nitrogen atom in the nucleus is substituted by an aliphatic radical having a hydroxyl, carboxyl or sulfo group, as described in U.S. Pat. Nos. 2,503,766; 3,459,553; 3,177,210; 3,384,486; 2,526,632; 2,493,748; 2,912,329 and 3,397,060, are useful in the present invention.

The dye developer is ordinarily dissolved in a solvent or a solvent mixture under heating, the solution of the dye developer is added to an aqueous solution of a hydrophilic colloid such as gelatin and after passing through a colloid mill suitable number of times, the mixture is directly coated or is coated after cooling, solidifying, cutting, washing, and melting. Or, alternatively, the solution of the dye developer is added to a silver halide emulsion and the mixture is coated. Preferred examples of the solvents used for the purpose are described in, for instance, the specifications of Japanese Patent Publication No. 13,837/1968 and U.S. Pat. No. 2,322,027.

The color developer used in the present invention can be dispensed using various methods in a hydrophilic colloid as a carrier corresponding to the type of developer. For example, a compound such as diffusion dye-releasing coupler having a dissociating group such as a sulfo or carboxyl group can be dissolved in water or alkaline aqueous solution and then added to a hydrophilic colloid solution. Color developers, which are difficult to dissolve in aqueous medium and easily dissolved in an organic solvent, are dissolved in an organic solvent, the resulting solution is then added to a hydrophilic colloid solution and dispersed as fine particles by agitation. As suitable solvents, there are mentioned ethyl acetate, tetrahydrofuran, methyl ethyl ketone, cyclohexanone, β-butoxy-β-ethoxyethyl acetate, dimethyl formamide, dimethyl sulfoxide, 2-methoxyethanol, tri-n-butyl phthalate and the like. Among these dispersion solvents, those having a relatively low vapour pressure can be evaporated off during the drying of the photographic layer or by the method as described in U.S. Pat. Nos. 2,322,027 and 2,801,171 before coating. Among these dispersion solvents, those easily soluble in water can be removed by the washing method as described in U.S. Pat. Nos. 2,949,360 and 3,396,027. To stabilize the dispersion of the color developer and promote the course of color image formation, it is advantageous to add a solvent, which is substantially insoluble in water and has a boiling point above 200° C at normal pressure, together with the color developer to a sensitive element. As high-boiling solvents suitable for the puspose, there are mentioned the triglycerides of higher fatty acids, aliphatic esters such as dioctyl adipate, phthalic acid esters such as di-n-butyl phthalate, phosphoric acid esters such as tri-o-cresyl phosphate and tri-n-hexyl phosphate, amides such as N,N-diethyl lauryl amide, hydroxy compounds such as 2,4-di-n-amyl phenol and the like. Further, to stabilize the dispersion of the color developer and promote the course of color image formation, it is advantageous to add a solvent-phile polymer together with color developer to the sensitive element. As solvent-phile polymers suitable for the purpose, there are mentioned shellac, phenol-formaldehyde condensates, poly-n-butyl acrylate, the copolymer of n-butyl acrylate and acrylic acid, the copolymer of n-butyl acrylate, styrene and methacryl amide, and the like. These polymers can be dissolved together with the color developer in an organic solvent and then dispersed in a hydrophilic colloid, or a hydrosol of the polymer, prepared by emulsion polymerization, can be added to the hydrophilic colloid dispersion of the color developer. In general, the dispersion of the color developer can be attained effectively in the presence of large shearing stress. For example, a high speed rotating mixer, a colloid mill, a high pressure milk homogenizer, the high pressure homogenizer disclosed in the British Pat. No. 1,304,264, and a supersonic emulsifier are useful. The dispersion of the color developer is promoted by using a surface active agent as an emulsion assistant. As surface active agents, which are useful for the dispersion of the color developer used in the present invention, there are mentioned sodium triisopropylnaphthalenesulfonate, sodium dinonylnaphthalenesulfonate, sodium p-dodecylbenzenesulfonate, sodium dioctylsulfosuccinate, sodium cetylsulfate and anionic surface active agents disclosed in the Japanese Patent Publication 4293/64; as described in U.S. Pat. No. 3,676,141, the combination of these anionic agents and higher fatty acid esters of anhydrohexitol shows an especially good emulsifying ability. Additionally, those disclosed in U.S. Pat. Nos. 3,287,133; 3,384,483; 2,992,104; 3,043,692; 3,044,873; 3,061,453; 3,069,263; 3,069,264; 3,121,011 etc. are suitable.

The specific examples of the dye developers used in this invention are the compounds described in the specifications of U.S. Pat. Nos. 3,255,001; 3,320,063;

| | | | |
|---|---|---|---|
| 2,992,106; | 3,297,441; | 3,134,762; | 3,236,643; |
| 3,134,763; | 3,134,764; | 3,134,672; | 3,134,765; |
| 3,183,089; | 3,135,734; | 3,135,604; | 3,173,906; |
| 3,222,169; | 3,183,090; | 3,201,384; | 3,246,955; |
| 3,208,991; | 3,142,565; | 2,983,605; | 3,047,386; |

3,076,820; 3,173,929; 3,230,083; etc.

Examples of specifically useful dye developers are 4-[p-(2',5'-dihydroxyphenyl)-phenylazo]-5-acetamido-1-naphthol, 4-[p-(2',5'-dihydroxyphenethyl)-phenylazo]-5-benzamido-1-naphthol, 1-phenyl-3-methyl-4-[p-(2',5'-dihydroxyphenethyl)-phenylazo]-pyrazolone, 2-[p-(2',5'-dihydroxypnenethyl)-phenylazo]-4-acetamido-1-naphthol, 2-[p-(2',5'-dihydroxyphenethyl)-phenylazo]-4-methoxy-1-naphthol, 2-[p-(2',5'-dihydroxyphenethyl)-phenylazo]-4-ethoxy-1-naphthol, 1-phenyl-3-N-n-butyl-carboxyamido-4-[p-(2',5'-dihydroxyphenethyl)-phenylazo]-5-pyrazolone, phenyl-3-N-n-hexylcarboxyamido-4-[p-(2',5'-dihydroxyphenethyl)-phenylazo]-5-pyrazolone, 1-phenyl-3-N-cyclohexylcarboxyamido-4-[p-(2',5'-dihydroxyphenethyl)-phenylazo]-5-pyrazolone, 1-phenyl-3-amino-4-(4'-[p-(2'',5''-dihydroxyphenethyl)phenylazo]-2',-5'-diethoxy(phenylazo)-5-pyrazolone. 1-acetoxy-2-[p-(β-hydroquinonyl)-phenylazo]-4-methoxynaphthalene, 4-isopropoxy-3-[p-(β-hydroquinonylethyl)-phenylazo]-1-naphthol. 1-acetoxy-2-[p-(β-hydroquinonylethyl)-phenylazo]-4-propoxynaphthalene, 1,4-bis(2',5'-dihydroxyanilino)-anthraquinone, 1,5-bis(2',5'-dihydroxyanilino)-4,8-dihydroxyanthraquinone, 1,4-bis[β-(2',5'-dihydroxyphenyl)-isopropylamino]-anthraquinone, 1,4-bis[β-(2',5'-dihydroxyphenyl)-ethylamino]-anthraquinone, 1-chloro-4-[β-(2',5'-dihydroxyphenyl)-ethylamino]-anthraquinone, N-monobenzoyl-1,4-bis[β-(2',5'-dihydroxyphenyl)-ethylamino]-anthraquinone, 5,8-dihydroxy-1,4-bis[β-hydroquinonyl-α-methyl)-ethylamino]-anthraquinone, etc.

When one amino nitrogen atom of the cyan dye developer such as, for instance, 1,4-bis[β-(2',5'-dihydroxyphenyl)-ethylamino]-anthraquinone is acylated, the color of the cyan dye developer changes into magenta and when both amino nitrogen atoms of it are acylated, the color thereof changes into orange-yellow. Similarly, by acylating the hydroxyl groups of the above-stated dye developers, the colors of the dye developers can be changed. Thus, the structure or the color of the dye developer can be changed by a development reaction, e.g., hydrolysis, that is to say, the color of the dye developer present in the photosensitive element can be changed when it is transferred to an image-receiving element. Examples of such compounds are described in the specifications of U.S. Pat. Nos. 3,307,947; 3,336,287; etc. A leuco compound such as 1-phenyl-3-methyl-4-(2'-methyl-4'-diethylamino)anilino-5-pyrazolone which does not give light filtering action to the emulsion layer under the layer containing it, which is immobilized at the developed portions, which diffuses imagewise from the undeveloped portions to an image-receiving element, and which is oxidized therein into a colored image can be also used.

The dye developer is disposed adjacent to the silver halide of a silver halide emulsion layer in the photosensitive element. That is to say, the dye developer or dye developers are incorporated in one or more emulsion layers and are preferably incorporated in silver halide emulsion layers or hydrophilic organic colloid layers under the corresponding silver halide emulsion layers. In particular, in a multilayer-type color photographic element for multicolor reproduction, it is particularly effective to incorporate the dye developer in the layer under the silver halide emulsion layer having the main light-sensitive region which is a complementary color to the color of the dye developer. However, as described above, when the developer which does not have a complementary color but gives the desired color in an image-receiving layer, the dye developer can be incorporated in the silver halide emulsion layer which is associated with the dye developer or in the layer adjacent to the silver halide emulsion layer. Furthermore, in an embodiment of the association of silver halide with a dye developer, it is possible that the dye developer in a mixed packet in the colloid surrounding particles or fine grains containing silver halide particles. Such a mixed packet system is disclosed in U.S. Pat. Nos. 2,800,457; 2,800,458; 2,907,682, 3,466,662; and 3,276,869.

As described above, it is preferred that the auxiliary developing agent be incorporated in a silver halide emulsion layer, a dye developer-containing layer, an intermediate layer, a protective layer, etc., of the photosensitive element. It is most preferred that the auxiliary developing agent be incorporated in one or more layers of the photosensitive element as a dispersion in an aqueous solution of an organic colloid such as gelatin as a solution thereof in a high-boiling organic solvent having a boiling point higher than about 175° C. Specific examples of these high-boiling organic solvents are phthalic acid alkyl esters of which the alkyl group has, preferably, less than 6 carbon atoms, such as methyl phthalate, ethyl phthalate, propyl phthalate, n-butyl phthalate, di-n-butyl phthalate, amyl phthalate, isoamyl phthalate, and dioctyl phthalate, phosphoric acid esters such as triphenyl phosphate, tricresyl phosphate, and diphenyl mono-p-tertiary butylphenyl phosphate; alkyl amides, and acetanilide such as N-n-butylacetanilide and N-methyl-p-methylacetanilide. The high-boiling solvents may be also used as mixtures with other solvents having boiling points lower than these high-boiling solvents by at least 25° C, to aid the solubility of the auxiliary developer and to permit the films, such as methyl acetate, ethyl acetate, propyl acetate, butyl acetate, isopropyl acetate, ethyl propionate, secondary-butyl alcohol, carbon tetrachloride, chloroform, benzyl alcohol, 2,3-methylcyclohexanone, and 2,4-methylcyclohexanone or solvents which are more soluble in water than the above-described high-boiling solvents and have a solubility of at least 2 parts thereof per 100 parts of water, such as methyl isobutyl ketone, β-ethoxyethyl acetate, β-butoxy-β-ethoxyethyl acetate, tetrahydrofurfuryl adipate, diethylene glycol monoacetate, methoxytriglycol acetate, acetonitrile acetone, acetone alcohol, ethylene glycol, diethylene glycol, dipropylene glycol, 2,3-methylcyclohexanone, 2,4-methylcyclohexanone, methylene glycol, monomethyl ether acetate, diethylene glycol monobutyl ether, cyclohexanone, and triethyl phosphate.

The amount of the auxiliary developing agent used in this invention depends on the amount and the kind of the dye developers used, the amount and the kind of silver halide, the layer structure of the photosensitive element, and the like but the amount thereof is usually 0.01 – 10 times, more generally 0.1 – 2 times the molar amount of the dye developer used. Also the amount is suitably 0.01 – 0.5 times the amount of the photosensitive silver halide. The amount generally used when the auxiliary developing agent is present in the processing solution is about 2 to 4 times the amount present when it is used in the photosensitive element. The silver halide coating amount generally is from about 0.4 to $4 \times 10^{-4}$ mol/100 $cm^2$, about 0.3 to 3 mol/100 $cm^2$ and about 0.3 to 3 mol/100 $cm^2$ for the red sensitive layer the green sensitive layer and the blue sensitive layer, respectively, for a total amount of about 1 to $10 \times 10^{-4}$ mol/100 $cm^2$. The amount is, however, not limited to these ranges and amounts outside these ranges can be used to achieve the objects desired.

Layers used in the present invention, which are permeable to treating solutions, such as a silver halide emulsion layer, a layer containing a color developer, auxiliary layers such as a protective layer or an intermediate layer, contain a hydrophilic polymer as a binder. As suitable polymers, there are mentioned gelatin, casein, gelatin modified with acylating agents etc., gelatin grafted with vinyl polymer, proteins such as albumin; cellulose derivatives such as hydroxyethylcellulose, methylcellulose and carboxymethylcellulose; partial hydrolysates of polyvinyl alcohol or polyvinyl acetate, high molecular weight nonelectrolytes such as polyvinyl pyrrolidone or polyacrylamide; polyacrylic acid, the partial hydrolysate of polyacrylamide, anionic synthetic polymers such as the copolymer of vinyl methyl ether and maleic acid, further amphoteric synthetic polymer such as the copolymer of N-vinyl imidazole acrylic acid and acrylamide or the polyacrylamide subjected to the Hofmann reaction. These hydrophilic polymers are used either alone or in as admixtures thereof. Further, these hydrophilic polymer layers can contain a polymer latex dispersion of hydrophobic monomer such as an alkyl acrylate or methacrylate etc. These hydrophilic polymers, above all the polymers having a functional group such as an amino, hydroxyl and carboxyl group, can be rendered non-soluble with many kinds of cross-linking agents without losing the permeability to the treating solution. As especially useful cross-linking agents, there are mentioned aldehyde compounds such as formaldehyde, glyoxal, glutaraldehyde, mucochloric acid or the oligomer or acrolein; aziridines such as triethylene phosphamide as described in the Japanese Patent Publication 8790/62; epoxy compounds such as 1,4-bis(2',3'-epoxypropoxy)diethyl ether as described in the Japanese Patent Publication 7133/59; active halogen compounds such as the sodium salt of 2-hydroxyl-4,6-dichloro-s-triazine as described in the U.S. Pat. No. 3,325,287; active olefin compounds such as hexahydro-1,3,5-triacryltriazine; methylol compounds such as N-polymethylol urea or hexamethylolmelamine; high molecular weight substances such as dialdehyde starch or the 3-hydroxyl-5-chloro-s-triazinylated gelatin described in the U.S. Pat. No. 3,362,827. These hydrophilic polymer layers can contain a cross-linking promotor such as carbonates or resorcine other than the cross-linking agent.

An image-receiving element which is dyed by the dye developers from the negative photosensitive element can be suitably selected. As the dyeable materials suitable for the image-receiving layer of the image-receiving element, there are gelatin, polyvinyl pyrrolidone, poly-4-vinylpyridine, polyvinyl acetate, polyvinyl alcohol, cellulose acetate, polyvinyl salicylate, partially hydrolyzed polyvinyl acetate, methyl cellulose, and mixtures of them.

The typical examples of the supports used for the image-receiving elements and for the photosensitive elements are cellulose nitrate films, cellulose acetate films, polyvinyl acetal films, polystyrene films, polyethylene terephthalate films, polyethylene films, polypropylene films, papers, polyethylene-coated papers, glass, etc. Also, the multilayer-type negative photosensitive element can be used as the support for the image-receiving element. The support can be tranparent or opaque according to the purposes.

It is particularly preferred, as described in the specification of U.S. Pat. No. 2,584,030, that the image-receiving element be associated with an acid polymer or an acid compound derivative which provides an acid material with a definite rate. Such an acid material is incorporated in the layer under the image-receiving layer of the image-receiving element. The acid material contributes to neutralize the alkali in the liquid processing composition on the image-receiving layer.

The diffusion transfer photographic film unit according to the present invention preferably possesses a function for neutralizing alkalis brought from the treating compositions. To provide a high pH-value, i.e., more than 10, preferably more than 11, sufficient to promote the course of image formation which comprises the development of the silver halide emulsion, the formation of the diffusing color image and the diffusion thereof, the treating composition contains an alkali. After the substantial completion of the formation of diffusion transfer image, the pH-value in the film unit is neutralized to approximately neutral, i.e., below 9, preferably below 8, to stop practically further image formation and prevent the change of image tone with the lapse of time. This results in preventing a color change and discoloration of image, which are caused at a high concentration of alkali, and contamination in white areas. For this purpose, it is advantageous to add a neutralizing layer containing a sufficient amount of an acid substance to neutralize the alkali in the treating solution up to the pH-value as described above, i.e., an acid substance in a surface concentration more than equivalent to the alkali in the spread treating solution, to the film unit. Preferred acid substances are those containing an acid group having a pKa value of less than 9, above all carboxyl or sulfonic acid group, or such a precursor that can provide such an acid group by hydrolysis. As specific examples, there are mentioned more preferably higher fatty acids such as oleic acid, as described in U.S. Pat. No. 2,983,606, as well as polymers of acrylic, methacrylic or maleic acid, or the partial esters or anhydrides thereof as described in U.S. Pat. No. 3,362,819. As examples of high molecular acid substances, there are mentioned copolymers of maleic anhydride and a vinyl monomer such as ethylene vinyl acetate, vinyl methyl ether etc. and the n-butyl half-ester, the copolymer of butyl acrylate and acrylic acid, cellulose acetate, acid phthalate and the like. In addition to these acid substances, the neutralizing layer can contain polymers such as cellulose nitrate and polyvinyl acetate, and further plasticizers as described in U.S. Pat. No. 3,557,237. The neutralizing layer further can be cured by cross-linking by means of polyfunctional azilysine compounds and epoxy compounds. The layer is placed in the image-receiving element and/or sensitive element. Especially, it is advantageous to place the layer between the support for the image-receiving element and the image-receiving layer. As described in the German Laid-open Patent No. 2,038,254, the acid substance can be encapsulated as microcapsules to join to the film unit.

The neutralizing layer or acid substance-containing layer used in the present invention is separated desirably from the treating solution layer to be spread by means of the neutralization controlling layer. The neutralization controlling layer serves to prevent undesirable reduction of the transferred image concentration due to the too rapid reduction of the pH-value of the treating solution by the neutralizing layer before the development of a given silver halide emulsion layer and the formation of the diffusion transfer image, so that the reduction of the pH-value can be retarded until after the given development and transfer. In a preferred embodiment according to the present invention, the image-receiving member comprises a multi-layer system support neutralizing layer neutralization controlling layer mordant layer (image-receiving layer). The neutralization controlling layer comprises mainly a polymer such as gelatin, polyvinyl alcohol, polyvinyl propyl ether, polyacrylamide, hydroxypropylmethyl cellulose, isopropyl cellulose, partial polyvinyl butylal, partially hydrolyzed polyvinyl acetate, the copolymer of $\beta$-hydroxyethyl methacrylate and ethyl acrylate, and the like. These polymers are cured usefully by cross-linking by means of aldehyde compounds such as formaldehyde or N-methylol compounds. Preferably, the neutralization controlling layer has a thickness of about 2 – 20 microns.

Furthermore, between the image receiving layer and the acid material-containing layer can be disposed a spacer layer, as disclosed in U.S. Pat. Nos. 3,362,819 and 3,362,821, for controlling the release of the acid material can be disposed. The image receivng element can further contain a development inhibitor such as mercaptotetrazole and iodine as disclosed in U.S. Pat. No. 3,265,498.

The image-receiving element used in the pesent invention fixes the color image-forming substance, such as diffusing dye, being released with the distribution of image from color developer in conjunction with silver halide emulsion. When the color image-forming substance is an anionic material such as a color developer having a hydroquinonyl group or coupling dye having a water-soluble acid group, the image-receiving element contains advantageously a basic polymer or a basic surface active agent. As basic polymers, those containing tertiary or quaternary nitrogen atoms are preferred: e.g., poly-4-vinyl pyridine; polymer of aminoguanidine derivative of vinyl methyl ketone described in U.S. Pat. No. 2,882,156; poly-4-vinyl-N-benzyl pyridinium p-toluene sulfonate; poly-3-vinyl-4-methyl-N-n-butyl pyridinium bromide; styrene/N-3-maleimidopropyl)-N,N-dimethyl-N-(4-phenyl benzyl ammonium chloride copolymer described in the British Patent No. 1,261,925, poly [N-(2-methacryloylethyl)-N,N-dimethyl-N-benzyl ammonium chloride], and the like. As basic surface active agents, those having both onium groupings such as ammonium, sulfonium or phosphonium and hydrophobic residues such as long chain alkyl radicals are preferred, e.g., N-lauryl pyridinium bromide, cetyl trimethyl ammonium bromide, methyl tri-n-lauryl ammonium p-toluene sulfonate, methylethylcetyl sulfonium iodide, benzidine triphenyl phosphorium chloride etc. Other than these basic compounds, compounds of polyvalent metals such as thorium, aluminium or zirconium have also a fixing action for the anionic color image forming substance. Advantageously, these compounds are formed in the form of a film together with a polymer such as gelatin (preferably, acid-treated gelatin), polyvinyl alcohol, polyacrylamide, polyvinyl methyl ether, hydroxyethyl cellulose. N-methoxy methyl polyhexylmethylene adipamide, polyvinyl pyrrolidone and the like.

Such image receiving materials are described in greater detail in the specifications of Japanese Patent Publication Nos. 8274/1963, 8449/1963, and 29756/1961 and the specifications of U.S. Pat. Nos. 3,003,872, 3,043,689, 3,065,074, 3,148,061, 3,239,337; 3,353,951 and 3,362,819.

The liquid processing composition for initiating the development of the exposed portions of the photosensitive element is a strongly alkaline solution and in general, is a solution having a pH above 12 or containing an OH ion concentration larger than 0.01 N. For such a purpose a compound capable of providing strong alkalinity, such as potassium hydroxide, sodium hydroxide, and sodium carbonate can be used. In the case of applying the alkaline processing solution to silver halide emulsion layers as a thin and uniform layer or film by spreading the processing composition or solution, a film-forming material capable of increasing the viscosity of the processing composition and forming a comparatively hard and stable film of the processing composition when the composition is spread and dried can be added to the alkaline processing composition. When the material exhibits the faculty of increasing viscosity in the alkaline processing solution for a long period of time, a film-forming material which is not substantially influenced in regard to the reduction in viscosity can be used. Preferred film-forming materials are water-soluble high molecular weight polymers inert to the alkaline processing solution, such as hydroxyethyl cellulose, sodium carboxymethyl cellulose, polyvinyl alcohol, polyacrylamide and other viscosity increasing agents, as disclosed in U.S. Pat. Nos. 3,351,465 and 3,362,822, etc.

In the color diffusion transfer process of this invention, it is preferred to conduct the development in the presence of a diffusible onium compound. Examples of such onium compounds are quaternary ammonium compounds, quaternary phosphonium compounds, and quaternary sulfonium compounds. The specific examples of the particularly useful onium compounds include 1-benzyl-2-picolinium bromide, 1-(3-bromopropyl)-2-picolinium-p-toluenesulfonic acid, 1-phenethyl-2-picolinium bromide, 2,4-dimethyl-1-phenethylpyridinium bromide, $\alpha$-picoline-$\beta$-naphthoylmethyl bromide, N,N-diethylpiperidinium bromide, phenethyltrimethyl phosphonium bromide, dodecyldimethylsulfonium-p-toluenesulfonium, etc.

The onium compound is preferably incorporated in the alkaline processing composition. It is most preferred that the amount of the onium compound used be 2 – 15 percent by weight of the total processing composition. By conducting the development processing in the presence of the onium compound, the quality of the transferred images increases greatly. Other examples of the onium compounds and other examples of the manner of using them are described in the specifications of U.S. Pat. Nos. 3,411,904 and 3,173,786.

Furthermore, the alkaline processing solution may contain a development inhibitor such as benzotriazole. The processing solution can further contain a shading agent such as titanium dioxide and carbon black. Moreover, the auxiliary developing agent of this invention can be incorporated in the alkaline processing solution.

The color photographic diffusion transfer process of this invention can also be applied to a film unit in which a photo-sensitive element is combined in a body with an image receiving element. Such a film unit is described in the specifications of U.S. Pat. Nos. 3,415,644; 3,415,645 and 3,415,646.

It is believed that at least a part of the dye developer will be oxidized during development and immobilized as the result of the reaction with the oxidation product of the auxiliary developing agent. The auxiliary developing agent is oxidized by the development of the exposed silver halide. The oxidized auxiliary developing agent is further caused to react with the unoxidized dye developer to regenerate the auxiliary developing agent for further reaction with the exposed silver halide. It is further believed that by using the auxiliary developing agent, at least a part of the auxiliary developing agent gives, as the result of such a reaction, a transferred image having improved image density, improved color separation and less color mixing.

The auxiliary developing agent used in this invention can be prepared by, for instance, the following manner.

SYNTHESIS EXAMPLE 126 g of hydroxyhydroquinone triacetate was dissolved in a mixture of 140 cc of glacial acetic acid, 100 cc of concentrated hydrochloric acid, and 58 g of acetone under heating at above 50°C–70°C and then the solution was allowed to stand for 24 hours at room temperature (about 20° – 30° C). Thereby, the reaction product liquid was discolored from dark red to dark brown and at the same time a red black solid was precipitated. The solid thus precipitated was recovered by filtration, washed well with water, and then 76 g of the crude light-brown crystals was recrystallized from water-acetone mixed solvent to give the desired product having a melting point of 275° – 277° C with a yield of 65.6 percent.

Elementary analysis:

Found: C 67.70% H 6.81%

Calculated: C 67.74% H 6.50%

Other methods of preparing the auxiliary developing agent are described in Journal of Chemical Society, 195(1939) and Journal of American Chemical Society, Vol. 58, 820(1936).

Now, the invention will be explained in greater detail by the following examples, in which percent is percent by weight unless otherwise indicated.

EXAMPLE 1

The following layers were coated successively on a cellulose triacetate support to give Film A.

(Film A)

1. Yellow Dye Developer Layer:

10 g of a yellow dye developer, 1-phenyl-3-N-n-hexylcarboxyamido-4-[p-(2',5'-dihydroxyphenethyl)-phenylazo]-5-pyrazolone was dissolved in a mixture of 10 cc of N-n-butylacetanilide and 25 cc of cyclohexanone and the solution was dispersed by emulsification in 100 cc of a 10 percent aqueous gelatin solution containing 8 cc of an 8 percent aqueous solution of sodium n-dodecylbenzenesulfonate. The emulsion thus prepared was mixed with 5 cc of a 2 percent aqueous solution of 2-hydroxy-4,6-dichloro-S-triazine sodium salt and further water was added thereto to make the total volume 300 cc. The mixture was coated on the support in a dry thickness of 2.0 microns.

2. Photosensitive Silver Halide Emulsion Layer:

A silver iodobromide emulsion (containing 5 mol percent silver iodide) containing $3.5 \times 10^{-2}$ mols of silver and 6.5 g of gelatin per 100 g of emulsion was coated on the dye developer layer in a dry thickness of 1.5 microns.

3. Protective Layer:

A coating composition of 100 cc of a 5 percent aqueous gelatin solution containing 2 cc of a 5 percent aqueous solution of sodium n-dodecylbenzenesulfonate and 5 cc of 2 percent mucochloric acid was coated on the silver halide emulsion layer in a dry thickness of 1.5 microns.

(Film B)

The same procedure as was used in the case of producing Film A was followed except that the photosensitive silver halide emulsion coating composition contained additionally 20 g of an emulsion prepared by dissolving 5 g of 1-phenyl-3-pyrazolidone in a mixture of 10 cc of tri-o-cresyl phosphate and 10 cc of ethyl acetate and dispersing the solution in 50 cc of a 10 percent aqueous gelatin solution.

(Film C)

The same procedure as was used in the case of preparing Film B was followed except that 10.5 g of the auxiliary developing agent of this invention was used in place of 5 g of 1-phenyl-3-pyrazolidone in the photosensitive silver halide emulsion coating composition.

Each of the Films A, B, and C thus prepared was exposed through a step wedge and treated in superposed relation with the image-receiving element as shown below with the following processing composition to conduct the transfer development. The processing composition was spread between the film and the image-receiving element in a ratio of 1.8 cc per 100 $cm^2$ of the image-receiving element. The composition of the processing solution used above was as follows:

| Processing Composition | |
|---|---|
| High viscous Hydroxyethyl Cellulose* | 35 g |
| Sodium Hydroxide | 45 g |
| Benzotriazole | 20 g |
| 1-Benzyl-2-picolinium Bromide | 20 g |
| Sodium Thiosulfate | 10 g |
| Water to give 100 cc | |

*NATROSOL TYPE 250 HR made by HERCULES Co.

Image-Receiving Element:

The image-receiving element used above was prepared by coating on a baryta-paper a solution of 2 g of poly-4-vinyl-pyridine (mordant) and 0.1 g of 1-phenyl-5-mercaptotetrazole in 100 g of a 10 percent aqueous gelatin solution in a dry thickness of 10 microns.

After 1 minute, the photosensitive element was stripped from the image-receiving element and then the blue filter reflective density of the yellow image thus transferred to the image-receving element was measured. The minimum transfer density and the maximum transfer density are shown in the following table.

| Film | Minimum Density | Maximum Density |
|---|---|---|
| A | 0.56 | 1.46 |

-continued

| Film | Minimum Density | Maximum Density |
|---|---|---|
| B | 0.35 | 1.38 |
| C | 0.10 | 1.52 |

From the above results it is clear that Film C containing the auxiliary developing agent of this invention gave an improved minimum density and maximum density of the transferred image as compared with those of the other films. Also, the transferred color image from Film C was less stained as compared with those of the other films.

EXAMPLE 2

Films D, E, and F were prepared in the following manner:

(Film D)

A multilayer photoelement was prepared by coating on a cellulose triacetate support the following layers successively.

1. Cyan Dye Developer Layer:

15 g of 1,4-bis-(α-methyl-β-hydroquinonylpropylamino)-5,8-dihydroxyanthraquinone was dissolved under heating to 70° C in a mixture of 25 cc of N,N-diethyllaurylanide, 25 cc of methylcyclohexanone, and 1 g of sodium dioctyl succinate. The solution was dispersed by emulsification in 160 cc of a 10 percent aqueous gelatin solution containing 10 cc of a 5 percent aqueous solution sodium n-dodecylbenzenesulfonate. After adding water to the emulsion to make the volume to 500 cc, the mixture was coated on the support in a dry thickness of 5 microns.

2. Red-sensitive Silver Halide Emulsion Layer:

A red-sensitive silver iodobromide emulsion (containing 1 mol percent silver iodide) containing $5.5 \times 10^{-2}$ mols of silver and 5.0 g of gelatin per 100 g of emulsion was coated on the cyan dye developer layer in a dry thickness of 3.5 microns.

3. Intermediate Layer:

100 cc of a 5 percent aqueous gelatin solution containing 1.5 cc of a 5 percent of aqueous solution of sodium n-dodecylbenzenesulfonate was coated on the silver halide emulsion layer in a dry thickness of 1.5 microns.

4. Magenta Dye Developer Layer:

10 g of a magenta dye developer, 4-propoxy-2-[p-(β-hydroxyquinonylethyl)phenylazo]-1-naphthol was dissolved under heating in a mixture of 20 cc of N-n-butylacetanilide and 25 cc of methylcyclohexanone and the solution was dispersed by emulsification in 120 cc of a 10 percent aqueous gelatin solution containing 8 cc of a 5 percent aqueous solution of sodium n-dodecylbenzenesulfonate. After adding water to the emulsion to make the volume to 400 cc the mixture was coated on the intermediate layer in a dry thickness of 3.5 microns.

5. Green-sensitive Silver Halide Emulsion Layer:

A green-sensitive silver iodobromide emulsion (containing 2 mol percent silver iodide) containing $4.7 \times 10^{2}$ mols of silver and 6.2 g of gelatin per 100 g of emulsion was coated in a dry thickness of 1.8 microns.

6. Intermediate Layer:

100 cc of a 5 percent aqueous gelatin solution containing 1.5 cc of a 5 percent aqueous solution of sodium n-dodecylbenzenesulfonate was coated on the silver halide emulsion layer in a dry thickness of 1.0 micron.

7. Yellow Dye Developer Layer:

10 g of a yellow dye developer, 1-phenyl-3-N-n-hexylcarboxyamido-4-[p-(2',5'-dihydroxyphenethyl)-phenylazo]-5-pyrazolone was dissolved under heating in a mixture of 10 cc of N-n-butylacetanilide and 25 cc of cyclohexanone and the solution was dispersed by emulsification in 100 cc of a 10 percent aqueous gelatin solution containing 8 cc of a 5 percent aqueous solution of sodium n-dodecylbenzenesulfonate. Then, after adding to the emulsion 5 cc of a 2 percent aqueous solution of 2-hydroxy-4,6-dichloro-S-triazine and further water to make the volume to 300 cc, the mixture was coated in a dry thickness of 1.5 microns.

8. Blue-sensitive Silver Emulsion Layer:

A blue-sensitive silver iodobromide emulsion (containing 7 mol percent silver iodide) containing $3.5 \times 10^{-2}$ mols and 6.5 g of gelatin per 100 g of emulsion was coated in a dry thickness of 1.5 microns.

9. Protective Layer:

A 4 percent aqueous gelatin solution containing 2 cc of a 5 percent aqueous solution of 5 percent sodium n-dodecylbenzenesulfonate and 5 cc of a 2 percent aqueous mucochloric acid solution was coated in a dry thickness of 1 micron.

(Film E)

The same procedure as was used in the case of preparing Film D was followed except that 100 cc of the coating composition for the protective layer of Film D was mixed with 50 g of an emulsion prepared by dispersing by emulsification in 50 cc of a 10 percent aqueous gelatin solution a solution of 5 g of 1-phenyl-3-pyrazolidone in a mixture of 10 cc of tri-o-cresyl phosphate and 10 cc of ethyl acetate and the mixture was coated in a dry thickness of 1 micron.

(Film F)

The same procedure as was used in the case of preparing Film D was followed except that 10.5 g of the auxiliary developing agent of this invention was used in place of 5 g of 1-phenyl-3-pyrazolidone in the coating composition for the protective layer.

Each of Films D, E. and F prepared was exposed through step wedge to white light and then was treated in superposed relationship with the image-receiving element as described in Example 1 with the processing composition as described in Example 1 to conduct transfer development for one minute. The processing composition was spread with a ratio of 1.5 cc per 100 $cm^2$ of the image-receiving element. The reflective densities of the color images thus transferred were measured using red, green, and blue filters respectively. The minimum transfer density and the maximum transfer density of each case are shown in the following table.

| Film | Filter | Minimum Density | Maximum Density |
|---|---|---|---|
| D | Blue | 0.32 | 1.05 |
| | Green | 0.42 | 1.32 |
| | Red | 0.28 | 1.03 |
| E | Blue | 0.23 | 0.96 |
| | Green | 0.25 | 1.25 |
| | Red | 0.26 | 0.89 |
| F | Blue | 0.18 | 1.15 |
| | Green | 0.15 | 1.29 |
| | Red | 0.17 | 1.10 |

From the results shown above it is clear that Film F containing the auxiliary developing agent of this invention gave improved minimum density and maximum density.

Each of the films prepared above was exposed in a camera to a subject and then subjected to transfer development as described in Example 1. The results showed that in Films D and E, the distinction of light and darkness was not clear and the contrast was low, while in Film F, the distinction of light and darkness was clear and the contrast was good. Also, Film F have a transferred image showing accurate color reproduction and having less color mixing and stains.

EXAMPLE 3

Film D prepared as described in Example 2 was exposed through a step wedge and was treated in superposed relation with the image-receiving element as shown below with the processing composition as shown below.

| | | | |
|---|---|---|---|
| Processing Composition | | | |
| | Auxiliary Developing Agent (shown in the following table) | shown in table | |
| | Water | 100 cc | |
| | Potassium Hydroxide | 11.2 g | |
| | Carboxymethyl Cellulose | 3.4 g | |
| | N Benzyl-αpicolinium Bromide | 1.5 g | |
| | Benzotriazole | 1.0 g | |
| | Titanium Dioxide | 50.0 g | |
| Composition | | Auxiliary Developing Agent | Amount |
| " | (a) | None(control) | |
| " | (b) | 1-Phenyl-3-pyrazolidone | 1.0 g |
| " | (c) | 4' Methylphenyl Hydroquinone | 1.0 g |
| " | (d) | 4 Methylcatechol | 1.0 g |
| " | (e) | Compound of This Invention | 1.0 g |
| " | (f) | Compound of This Invention | 10.0 g |

Image-Receiving Element:

The image-receiving element was prepared by coating successively on a transparent support an acid polymer layer of acrylic acid-butyl acrylate copolymer (1:1 molar ratio; mol. wt. about 50,000) for controlling the pH of the processing composition, a spacer layer of polyvinyl alcohol, and a dyeable layer of poly-4-vinylpyridine and polyvinyl alcohol.

The densities of the transferred images on the image-receiving element were measured in each case, the results of which are shown in the following table.

| Processing Composition | Filter | Minimum Density | Maximum Density |
|---|---|---|---|
| (a) | Blue | 0.35 | 1.11 |
| | Green | 0.44 | 1.25 |
| | Red | 0.36 | 1.00 |
| (b) | Blue | 0.30 | 1.05 |
| | Green | 0.39 | 1.10 |
| | Red | 0.32 | 0.98 |
| (c) | Blue | 0.25 | 1.21 |
| | Green | 0.28 | 1.30 |
| | Red | 0.20 | 1.05 |
| (d) | Blue | 0.28 | 1.10 |
| | Green | 0.31 | 1.20 |
| | Red | 0.26 | 0.98 |
| (e) | Blue | 0.24 | 1.20 |
| | Green | 0.25 | 1.35 |
| | Red | 0.18 | 1.11 |
| (f) | Blue | 0.18 | 1.20 |
| | Green | 0.19 | 1.37 |

-continued

| Processing Composition | Filter | Minimum Density | Maximum Density |
|---|---|---|---|
| | Red | 0.18 | 1.08 |

As is clear from the above results, in the color images obtained by the process of this invention, remarkable improvements were observed with respect to the minimum transferred density and the maximum transferred density. Also, the transferred color image had less color stains in the case of employing the processing composition containing the auxiliary developing agent of this invention.

While the invention has been described in detail and with reference to specific embodiments thereof, it will be apparent to one skilled in the art that various changes and modifications can be made therein without departing from the spirit and scope thereof.

What is claimed is:

1. A color photographic diffusion transfer process comprising:

imagewise exposing a photographic material having at least one silver halide emulsion layer and a dye developer present adjacent to the silver halide in said silver halide emulsion layer and treating said photographic material in superposed relation with an image-receiving material with an alkaline processing solution whereby the dye developer at the exposed portions of the silver halide emulsion layer is immobilized and the dye developer at the unexposed portions of the silver halide emulsion layer is transferred by diffusion to the image-receiving material, said treatment with said alkaline processing solution being in the presence of 6,6',7,7'-tetrahydroxy-4,4,4',4'-tetramethyl-bis-2,2'-[spirocumarone] *spirochroman*.

2. The color photographic diffusion transfer process as set forth in claim 1, in which [acid] *said* 6,6',7,7'-tetrahydroxy-4,4,4',4'-tetramethyl-bis-2,2- [spirocumarone] *spirochroman* is present in said photosensitive material.

3. The color photographic diffusion transfer process as set forth in claim 1, in which said 6,6',7,7'-tetrahydroxy-4,4,4',4'-tetramethyl-bis-2,2'- [spirocumarone] *spirochroman* is present in said alkaline processing solution.

4. The color photographic diffusion transfer process as set forth in claim 1, in which said 6,6',7,7'-tetrahydroxy-4,4,4',4'-tetramethyl-bis-2,2'- [spirocumarone] *spirochroman* is present in said image-receiving element.

5. The color photographic diffusion transfer process as set forth in claim 1, wherein said photographic material is a multi-layer photographic material having in order on a support, a red-sensitive silver halide emulsion layer, a green-sensitive silver halide emulsion layer, and a blue-sensitive silver halide emulsion layer, and wherein said 6,6',7,7'-tetrahydroxy-4,4,4',4'-tetramethyl-bis-2,2'-[spirocumarone] *spirochroman* is present in one of said silver halide emulsion layers.

6. The color photographic diffusion transfer process of claim 1, wherein 6,6',7,7'-tetrahydroxy-4,4,4',4'-tetramethyl-bis-2,2'-[spirocumarone] *spirochroman* is present at a level of 0.01–0.5 times on a molar basis of the amount of the photosensitive silver halide present.

* * * * *